No. 12,022. Reissued Aug. 19, 1902.

J. H. ELWARD.

PNEUMATIC STACKER.

(Application filed May 5, 1902.)

4 Sheets—Sheet 1.

WITNESSES:

Frank A. Lahle

J. A. Walsh.

INVENTOR

John H. Elward

BY

Bradford & Hood,

ATTORNEYS

No. 12,022.

Reissued Aug. 19, 1902.

J. H. ELWARD.

PNEUMATIC STACKER.

(Application filed May 5, 1902.)

4 Sheets—Sheet 2.

WITNESSES:

Frank A. Fahle

J. A. Walsh.

INVENTOR

John H. Elward

BY

Bradford & Hood

ATTORNEYS

No. 12,022.
Reissued Aug. 19, 1902.
J. H. ELWARD.
PNEUMATIC STACKER.
(Application filed May 5, 1902.)
4 Sheets—Sheet 3.
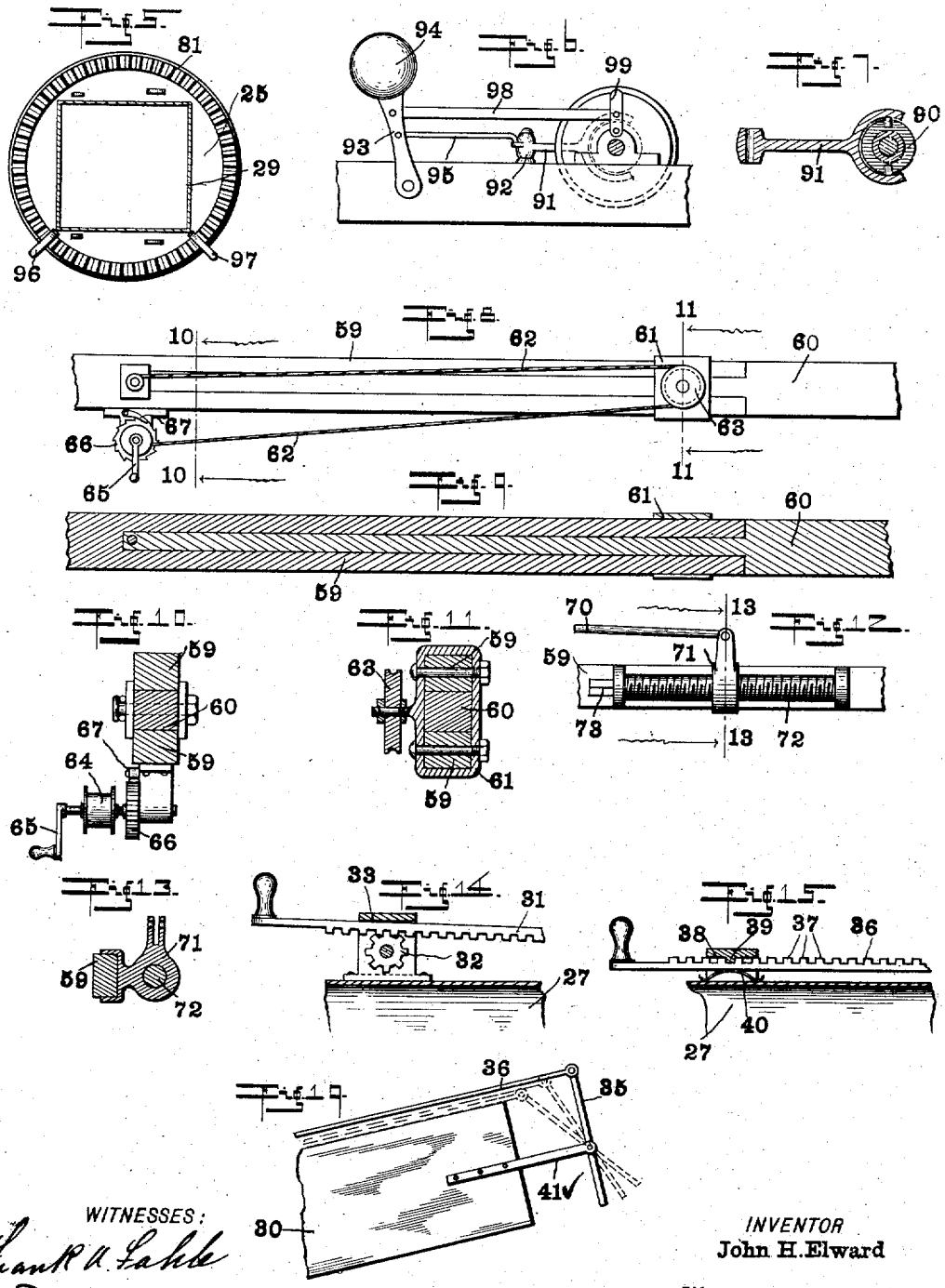
WITNESSES:
Frank A. Lahle
J. A. Walsh.
INVENTOR
John H. Elward
BY
Bradford & Hood,
ATTORNEYS No. 12,022.
Reissued Aug. 19, 1902.
J. H. ELWARD.
PNEUMATIC STACKER.
(Application filed May 5, 1902.)
4 Sheets—Sheet 4.
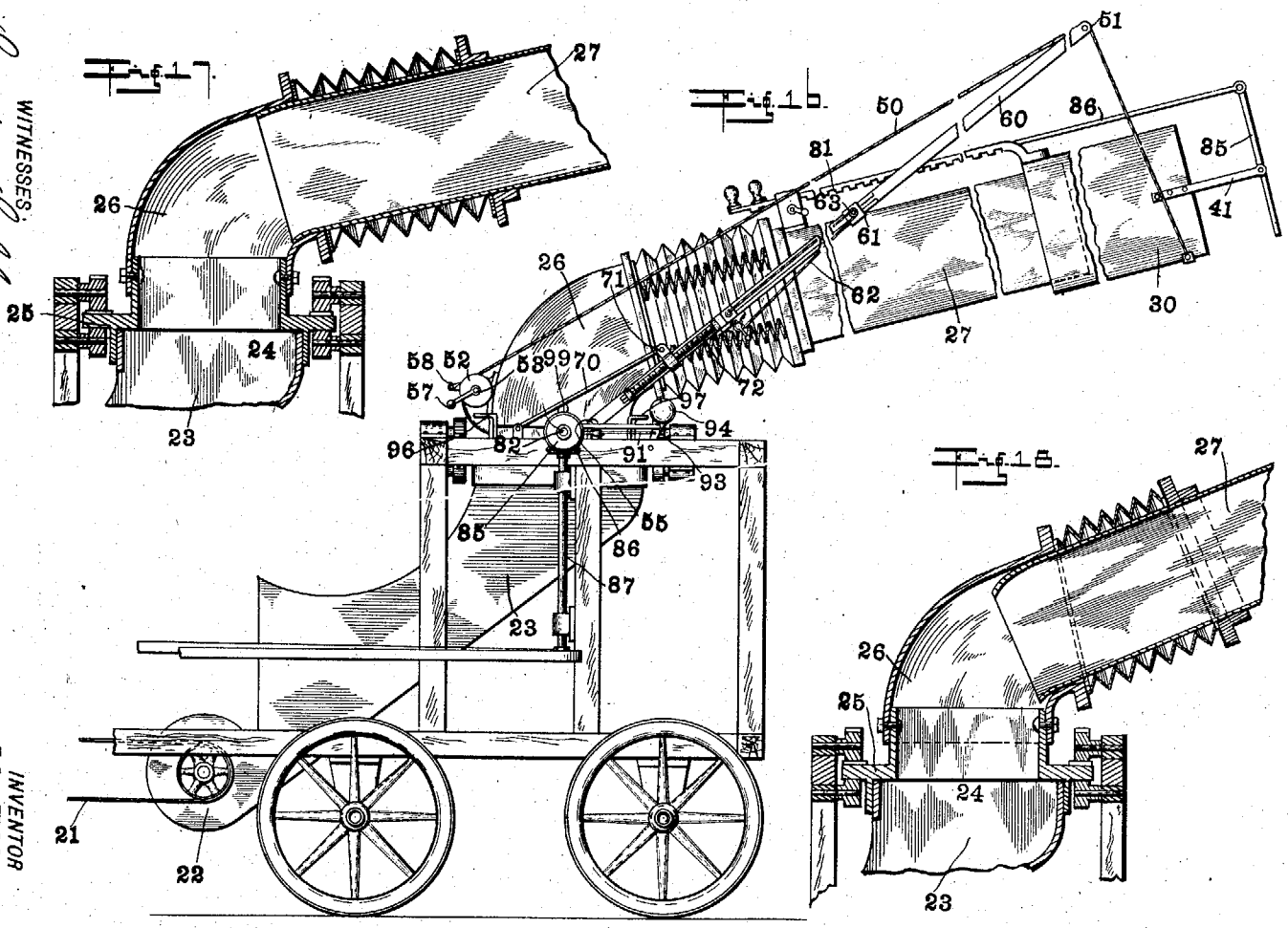
WITNESSES:
Frank A. Lahle
J. A. Walsh.
INVENTOR
John H. Elward
BY
Bradford V. Hood,
ATTORNEYS

UNITED STATES PATENT OFFICE.

JOHN H. ELWARD, OF HUTCHINSON, KANSAS, ASSIGNOR, BY DIRECT AND MESNE ASSIGNMENTS, TO THE INDIANA MANUFACTURING COMPANY, OF INDIANAPOLIS, INDIANA, A CORPORATION OF WEST VIRGINIA.

PNEUMATIC STACKER.

SPECIFICATION forming part of Reissued Letters Patent No. 12,022, dated August 19, 1902.

Original No. 688,400, dated December 10, 1901. Application for reissue filed May 5, 1902. Serial No. 105,917.

*To all whom it may concern:*

Be it known that I, JOHN H. ELWARD, a citizen of the United States, residing at Hutchinson, in the county of Reno and State of Kansas, have invented certain new and useful Improvements in Pneumatic Stackers, of which the following is a specification.

This invention relates to machines or apparatus for taking away straw, stalks, chaff, dust, &c., from threshing and such like machines and conveying away and depositing the same upon stacks or elsewhere, such machines usually being known as "pneumatic straw-stackers," and the nature and character of said improvements will more fully appear hereinafter.

Figure 1:
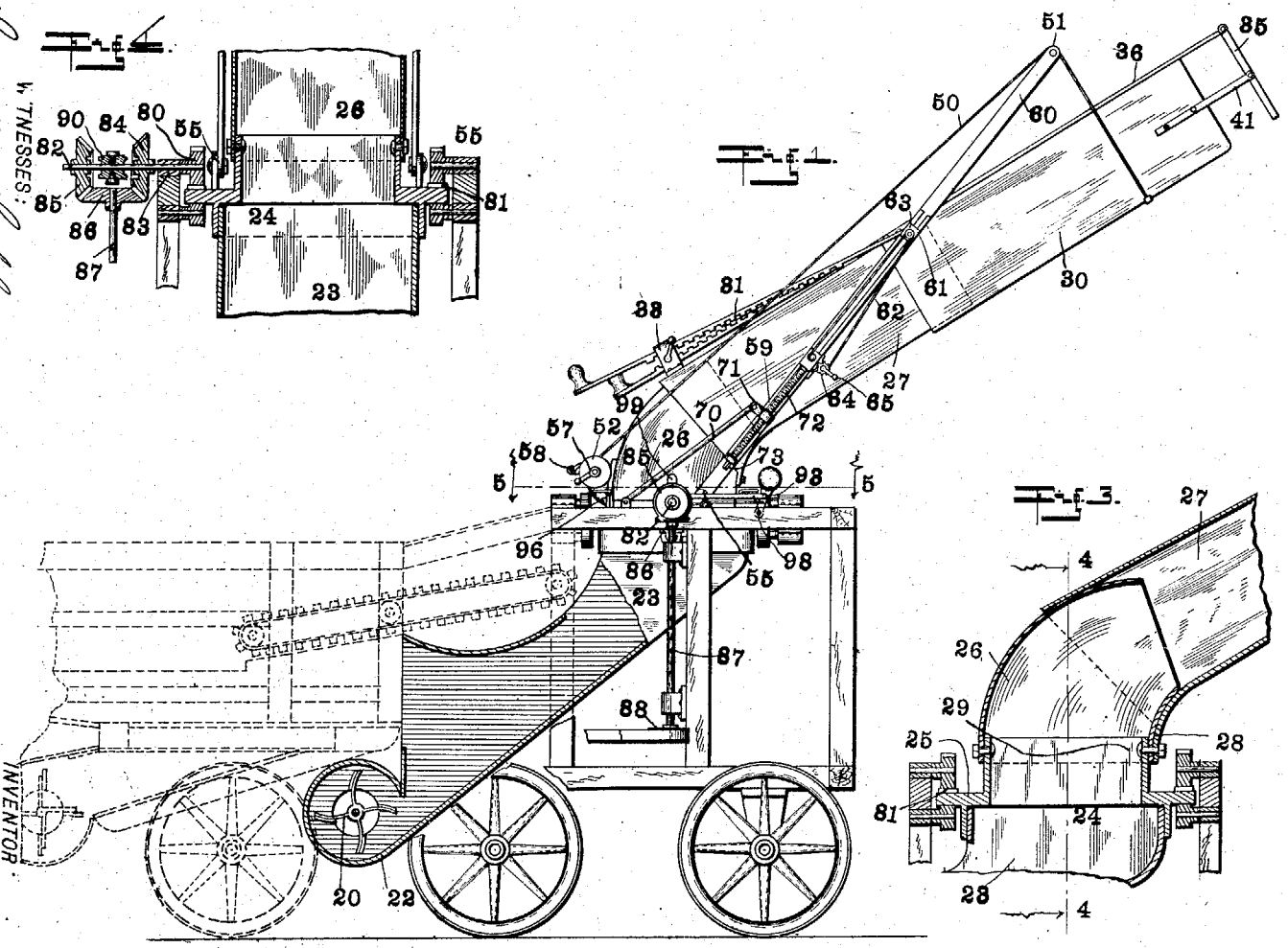
Figure 2:
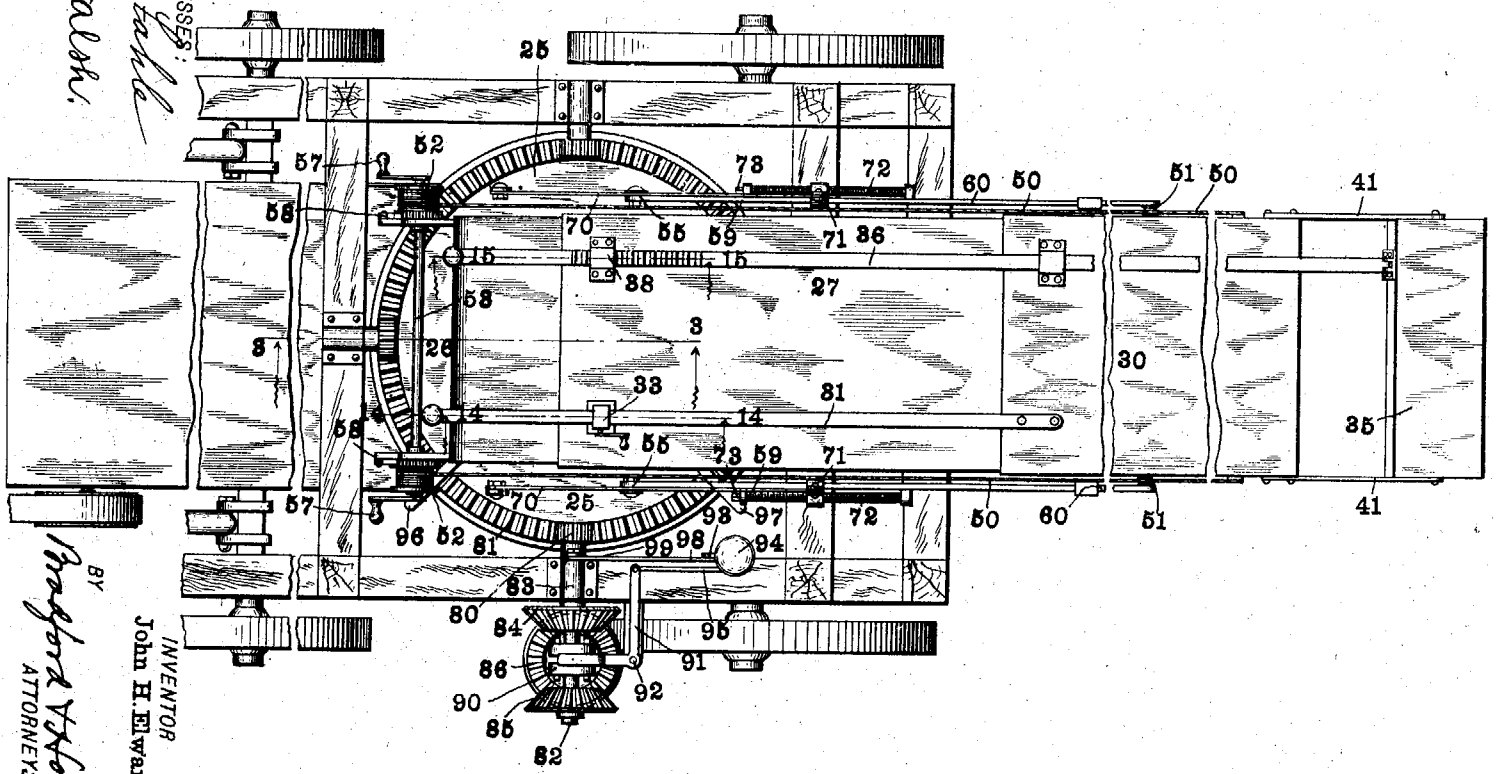

Referring to the accompanying drawings, which are made a part hereof, and on which similar reference characters indicate similar parts, Figure 1 is a view, partly in side elevation and partly in vertical section, of a mechanism especially designed for stacking straw embodying my improvements, a portion of a threshing-machine or separator with which the same is used being shown by means of dotted lines and illustrating in a general way the relation and coöperation of the two machines; Fig. 2, a top or plan view of the machine shown in Fig. 1 on a considerably-enlarged scale, portions being broken out and the length of the view thus shortened in order to secure such enlarged scale; Fig. 3, a detail vertical central sectional view through the stump of the straw-stacker and immediately adjacent parts, as seen when looking in the direction indicated by the arrows from the dotted line 3 3 in Fig. 2; Fig. 4, a detail transverse vertical sectional view through the same parts as seen when looking in the direction indicated by the arrows from the dotted line 4 4 in Fig. 3; Figs. 5 to 15, inclusive, detail sectional or fragmentary views illustrating the construction and operation of various of the parts, the points at which section-lines are taken being generally indicated by dotted lines numbered similarly to the figures of drawings and the direction of sight being indicated by arrows alongside said dotted lines; Fig. 16, a view in many respects similar to Fig. 1, but illustrating a modification or alternative construction; Fig. 17, a detail central longitudinal vertical sectional view of a portion of Fig. 16; Fig. 18, a view similar to Fig. 17, but illustrating another position or adjustment of the stacker trunk or duct; and Fig. 19 a side elevation of the upper end of the stacker trunk or duct similar to portions of Figs. 1 and 16, but illustrating by means of dotted lines various of the adjustments of the deflector.

In the drawings, as above indicated, I have shown (in one view) a portion of a threshing-machine sufficient to illustrate the manner of employing my invention in connection therewith merely for purposes of illustration, the elevator or stacker herein described being adapted for use with any of the several styles or makes of threshing-machines. The elevator or stacker is shown as provided with a supporting-frame and transporting-wheels. The supporting-frame is shown as comprising suitable sills, cross-timbers, and uprights, the upper portion forming a framework in which the stacker-trunk or delivery-duct is suitably mounted and which carries the mechanism for manipulating the same.

The elevator or stacker comprises as its essential elements an initial receptacle, an air-blast mechanism, the outwardly and upwardly extended material-delivery trunk or duct, and means for manipulating the latter in the manner and for the purposes hereinafter specified.

The threshing-machine or separator is provided with the usual exits for straw, chaff, &c., and these communicate with the stacker, thus enabling the latter to receive the same and blow them out onto the stack or place provided for the deposit thereof. At a suitable point in the lower portion of the stacker structure I mount an ejector or blast-fan 20, which is shown as driven by a belt 21, running from a suitable point on the separator. (Not shown.) From the housing 22 of this fan a conduit 23 leads up to the upper portion of the supporting-frame for the stacker and forms the first section of the stacker trunk or duct, through which the air-blast (which is of sufficient strength to propel the chaff and straw upward and outward) will pass, carrying the chaff and straw with it.

To conveniently and efficiently direct and control the material which is carried upward and backward by the air-blast to the places where it is desired to deposit it, I combine with the above parts an adjustable mechanism for guiding the straw and the air-current, as follows: The initial or primary duct-section 23 terminates in a circular portion at 24, and around this is positioned a ring or turn-table 25, which is mounted between suitable trucks or supports and is capable of carrying that portion of the stacker mounted thereon from side to side as it revolves in its bearings. A neck or stump 26 is secured to the above-described ring or turn-table 25 and is suitably curved to aid in giving the conduit a change of direction at this point, and to this neck or stump is fitted the lower part 27 of the main delivery trunk or duct by means of which the material is conveyed away to its destination. It surrounds the upper or outer part of the neck or stump, and in the construction shown in Figs. 1 to 3 the bottom is extended somewhat and at the inner end 28 is formed of elastic material, by which elastic part the duct-section 27 is secured to the neck 26, as by means of a bolt or rivet 29, so that the trunk or duct may be readily adjusted vertically to any desired position, the portion thereof in contact with or surrounding the walls of the stump or neck moving on curved lines longitudinally of said neck—that is, the said portions of the lower or inner end of said trunk or duct section are arranged to vibrate relatively to or to move toward and from the rotary base or support when the vertical position of its outer end is varied. I thus provide intermediate the primary duct or conduit and the main delivery duct or trunk two joints, whereby motion in two directions is provided for. The delivery trunks or ducts are ordinarily made of sheet-steel, as is common, and the portions are fitted snugly together, and the attachment is effected in such way that as the outer end of the delivery-trunk is raised or lowered connection is maintained with the base-section. The union between the primary duct-section and the ring or turn-table is also substantially air-tight. An outer delivery trunk or duct section 30 is fitted to the outer end of the section 27 and is adapted to be moved out or in rectilineally in relation thereto. The two sections 27 and 30 are telescopically connected, and the mechanism for effecting the longitudinal movement of the section 30 comprises a rack-bar 31, secured to it, and a pinion 32, mounted in bearings in a suitable housing 33 on the section 27, as is most plainly shown in Fig. 14. The end of the outer duct-section 30 is provided with an adjustable deflector 35, adapted to direct the straw in any line desired. To adjust this, use is made of a bar 36, extending back to a point where it will be accessible and having combined with it means for locking it in any desired position. In the construction shown the bar 36 is provided on its upper surface at a suitable point with a series of teeth or projections 37. The toothed or corrugated portion of the bar 36 extends through a guide-clip 38, mounted on the duct-section 27, and within said clip is formed one or more lugs or stops 39, adapted to engage with the said teeth and hold the said bar stationary and retain the adjustable guide or deflector 35 in the desired position. A leaf-spring 40 or equivalent device is arranged within the clip 38 beneath the bar 36 and serves to keep the teeth on said bar in engagement with the pin or stop 39. The deflector 35 is illustrated as being supported at a distance from the end of the delivery trunk or duct and is carried by arms or bearers 41, to which it is pivoted. By thus arranging the deflector it can be held in the position indicated in Fig. 1 entirely out of contact with and at a distance from the mouth of the stacker trunk or duct, so that air escaping therefrom is allowed to dissipate in all directions, or, as shown in dotted lines in Fig. 19, the deflector can be adjusted to contact with and form a continuation or extension of the upper wall of the delivery-trunk—that is, the straw and chaff can be readily guided into the proper paths and deposited at the desired points by adjusting the deflector.

To raise and lower the delivery trunk or duct, use is made of ropes or cords 50. They are secured at their outer ends to the duct-section 30 (preferably at or near the middle thereof longitudinally) and then extend up over sheaves 51 and down to drums or spools 52 on the winding-shaft 53, which is mounted behind the neck or stump 26 and is provided with cranks at 57 for winding it and pawls 58 for holding it. The sheaves or pulleys 51 are mounted in the outer ends of supports therefor, which are shown as composed of two or more sections so connected as to provide for extension, and each support as a whole is pivoted at 55 to the aforesaid ring or turn-table. To permit of the longitudinal extension of the supports, they are made in two sections 59 and 60, the part 59 being preferably slotted, as best shown in Figs. 8 and 9, and the part 60 being tongued to fit the slot. Metal loops 61 can be placed around the overlapping parts, so as to hold them firmly into proper relation with each other and yet allow a longitudinal movement. The part 60 is moved outwardly by a rope 62, which has its end fastened to the lower end of the tongue portion of the part 60 and passes thence upwardly to a sheave 63 on the loop 61 and thence down to a winding drum or spool 64, mounted on the part 59 and having a crank 65 and a detent-ratchet 66, with which a pawl 67 will engage.

To hold the support at the desired angle of inclination to the plane of the turn-table 25, I use bars 70, which are pivotally connected to said turn-table and are connected to the support by means of a nut 71 and a screw-rod 72, mounted in bearings on the support part 59, the nut 71 having a suitable extension to which the supporting link or bar 70 is pivoted. The screw 72 can be rotated, as by applying a wrench at 73, and the nut can thereby be moved up and down as desired.

As it is desirable to deposit the straw not only at points in the vertical central longitudinal plane of the machine, but also at points in plane with the sides thereof in order to distribute the stack over a ground area as large as possible, and is also desirable to constantly change the point of the deposit, I combine with the mechanism above described means for automatically oscillating the stacker trunk or duct. To this end I provide a pinion 80, which engages with suitable gear-teeth 81 on the ring or turn-table 25 and is carried by a shaft 82, mounted in a bearing at 83, secured to the adjacent portion of the frame. This shaft has also two bevel-wheels 84 and 85, each adapted to engage with a bevel-pinion 86, mounted on the vertical shaft 87, said shaft having a belt-wheel 88, from which a suitable belt connection extends to any suitable pulley on the thresher. The wheels 84 and 85 are loose upon the shaft 82 and are continuously rotated in opposite directions. A clutch 90 is feathered to the shaft 82 and is adapted to engage said wheels alternately with said shaft. The clutch is automatically shifted as follows: A bell-crank lever 91 is pivoted on a suitable support at 92. A vibrating lever 93 is mounted on the framework and is provided with a weight 94 to carry it past its center and temporarily hold it. This lever is preferably pivoted so as to vibrate in a plane which is tangent to the circle of rotation of the ring or turn-table 25 and is connected with the bell-crank lever 91 by means of a rod or link 95. Said turn-table or some part carried thereby is provided with trip-pins 96 and 97, and the vibrating lever 93 or a part connected with it lies in the path of their travel. As shown, this lever 93 is connected by a link 98 to a lever 99, which latter can be impinged on by the said trip-pins 96 and 97. When the pin 96 reaches said lever 99, it throws it and the lever 93 over, so as to reverse the clutch, and thereupon the motion of the shaft 82 is reversed and also that of the ring or turn-table 25. This movement of the latter continues until the trip-pin 97 reaches the lever 99, whereupon the latter is thrown back, and the shaft 82 and the ring or turn-table 25 are again reversed. In this way the stacker trunk or chute will be oscillated so that the straw can be delivered from its outer end over a large area.

The manner of operating the above-described machine will be readily understood. After the thresher and the stacker have been brought into the requisite positions and adjusted and the driving-belts properly connected the outer duct-section 30 is extended to the desired point, and the delivery trunk or duct composed of the duct-sections is adjusted to the proper inclination. As soon as the thresher begins to deliver straw and chaff they are immediately caught up by the air-blast from the fan and carried out through the various duct-sections and thrown to the desired point. As the stack becomes higher the parts 27, 30, and 35 are varied by the adjusting devices described, and the position of the deflector is varied as may be desired by its controlling devices.

In Figs. 16, 17, and 18 I have illustrated the fact that the trunk or duct section 27 and the neck or stump 26 can be connected in a modified way and by the employment of a flexible covering device the necessity of an air-tight union between the vertically-adjustable portion of the delivery trunk or duct and its stump or neck be avoided, although they should be fitted as closely together as practicable without interfering with the desired play laterally and vertically of the outer end of said trunk or duct. These modified or alternative forms are, however, made the subject of a separate or divisional application, Serial No. 85,253, filed by me December 9, 1901, and consequently will not be more fully described herein.

I am aware of the fact that mechanisms have been made or proposed comprising tubes one sliding upon another, in combination with means for effecting such sliding, these means including sometimes a rack and a pinion, as shown in the patent, No. 319,552, to I. Brokaw and W. Butler, and sometimes a rope and sheaves, as shown in the patent, No. 405,331, to L. Smith, and of course I do not wish to be understood as broadly claiming either of these old mechanisms for all such purposes; but I believe myself to be the first to have constructed a pneumatic stacker for threshing-machines in which the air trunk or chute could be varied at any time even when in full operation and by devices, such as aforesaid, accessible to the operator when standing near the inner or lower end of the duct, so that the material could be delivered at points gradually farther from the thresher without altering the elevation of the chute and in which the vertical position of the delivery end of the chute could be varied at any time, so that the straw could not only be carried first nearer and then farther from the thresher, but could also be gradually piled higher and higher, as well as taken farther and farther out, and while I have above given a specific description of the illustrated devices in order that the features of invention can be fully understood I wish it to be also distinctly understood that I do not limit myself to all of said specific matters, for there can be many modifications as concerns the details of construction and arrangement without departing from the invention.

What I claim is—

1. In a pneumatic straw-stacker, the combination of an ejector-fan, a rotary base, a duct-section upon and rotating with said base, a second duct-section supported upon and having its lower end vibratable relative to the rotary base, and connected with the base duct-section to form a continuation thereof, a third, outer, duct-section telescopically connected to the second section, said second and third sections being adapted to have their outer ends raised and lowered relatively to the base, means rotatable around the axis of the base for adjustably supporting the outer duct-section at different elevations, and means for positively moving the third outer duct-section longitudinally outward relative to the second section and also positively moving it inward relatively thereto, whereby the operator can, while the machine is in operation, move the outer duct-section to elongate or shorten the total duct, substantially as set forth.

2. In a pneumatic straw-stacker the combination of an ejector-fan, a rotary base, a duct-section supported upon and rotating with the base, a second duct-section supported upon and having its lower end vibratable relative to the rotary base, and connected with the base duct-section, a third outer duct-section telescopically connected to the second duct-section, said second and third sections being adapted to have their outer ends raised and lowered relatively to the base, means rotatable around the axis of the base, for adjustably supporting the outer duct-section at different elevations, and an adjusting mechanism having one member connected to the second duct-section, and a second member connected to the third outer duct-section, said members engaging with each other and being adapted to advance the third outer duct-section outward and to draw said duct-section inward positively while the machine is in operation, substantially as set forth.

3. In a pneumatic straw-stacker, the combination of an ejector-fan, a duct leading therefrom, a base arranged to rotate around a vertical axis, an upwardly-extending duct-section connected to the base and rotating therewith, a second duct-section supported upon the rotary base and having its lower end connected with the base duct-section to form a continuation thereof, a third, outer, duct-section telescopically connected to the second duct-section, said second and third duct-sections being adapted to have their outer ends raised and lowered relatively to the base, means rotatable around the axis of the base for supporting the outer duct-section at different elevations, an adjusting mechanism having a longitudinally-movable member secured to, and upon the outside of, the third outer duct-section and a second member supported in rear of said outer duct-section, said two members mutually engaging with each other, and a crank, for actuating the last said member of said adjusting mechanism, substantially as set forth.

4. In a pneumatic stacker, the combination of an ejector-fan, a horizontally-rotary base or turn-table, a duct-section mounted on said base, a second duct-section connected with said base-section, a third outer, duct-section, telescopically connected with said second duct-section, devices for positively moving said outer duct-section longitudinally to either increase or decrease the length of the total duct, said devices comprising a movable member connected with the outer duct-section and extending longitudinally thereof and of the second section, to points adjacent to the inner end of said second section, and a relatively stationary member arranged adjacent to the base-section and engaging with the said movable member, whereby the operator can either increase or diminish the length of the duct from a point near the inner end thereof, while the machine is in operation, substantially as set forth.

5. In a pneumatic stacker, the combination of an ejector-fan, a turn-table or rotary base mounted to turn about a vertical axis, a tubular neck or stump secured to said base, a second duct-section having its inner end connected with said neck and having its outer end movable vertically, a third, outer, duct-section telescopically connected to said second duct-section, means adapted to turn about the axis of the rotary base, for supporting said third duct-section in line with the said second duct-section and the discharge-opening in the neck, means for adjusting both said second and third duct-sections vertically, and a rod connected at its outer end with the outer duct-section, and extending to points beyond the inner end of said third duct-section, for positively pushing the said third duct-section outwardly to lengthen the total duct and to draw said outer duct-section inwardly to shorten the total duct, substantially as set forth.

6. In a pneumatic stacker, the combination of an ejector-fan, a turn-table or rotary base mounted to turn about a vertical axis, a longitudinally-curved neck or stump mounted on said rotary base, an intermediate duct-section connected with said neck, an outer duct-section telescopically connected to said second duct-section, auxiliary upwardly-extending supports for said outer duct-section mounted on the rotary base, and extending to points beyond the outer end of the second duct-section, one or more winding-ropes bearing upon said auxiliary upwardly-extending supports and connected with said outer duct-section at a point near the outer end thereof, means for winding said rope or ropes to adjust both said outer and intermediate duct-sections vertically, and means extending to a point adjacent to the said neck for positively moving the outer duct-section outwardly to increase the length of the total duct and for positively moving said outer duct-section inwardly to shorten the total duct, substantially as set forth.

7. In a pneumatic stacker, the combination of an ejector-fan, a turn-table or rotary base adapted to rotate about a vertical axis, a duct-section mounted on said base to rotate therewith, a second duct-section communicating with said base-section, a third outer section telescopically connected with the said second duct-section, an auxiliary support having a member adapted to rotate about the axis of said rotary base and a member longitudinally adjustable of the first said member and extending to points beyond the outer end of said second duct-section, connections between the outer adjustable member of said auxiliary support and the third outer duct-section, means for simultaneously adjusting the outer and second duct-sections vertically, and means connected with the outer duct-section to positively move said section outwardly to increase the total length of the duct and to positively move said outer duct-section inwardly to shorten the total duct, substantially as set forth.

8. In a pneumatic stacker, the combination of a turn-table or rotary base, or main support, a fan below said support, a neck or "stump" mounted on and rotating with said rotary base, a stationary conduit connecting the said neck with the fan-chamber, a second duct-section connected with said base-section, an outer duct-section telescopically connected to the last-said duct-section, a deflector adapted to direct the path of material issuing from said outer duct-section, independent means for positively moving said outer duct-section outward to lengthen the total duct and positively moving said outer duct-section inward to shorten the total duct, and adjusting means connected with the deflector, and extending to a point adjacent to the turn-table or rotary base, whereby the operator can, while the machine is in operation, elongate or shorten the duct and adjust the deflector as desired, substantially as set forth.

9. In combination with the telescopic trunk, the deflector hinged to the outer trunk-section, an operating-rod attached to said deflector and extending back along the trunk, and operating means connected to said rod and mounted on and carried by the inner trunk-section, substantially as and for the purpose hereinbefore set forth.

10. In combination with the telescopic trunk and the guide attached to the outer section, a deflector hinged to said outer section, an operating-rod attached to said deflector and extending back through and beyond the guide, and operating means connected to the said rod, and mounted on the inner trunk-section, substantially as and for the purpose hereinbefore set forth.

11. In a pneumatic straw-stacker, the combination of an ejector-fan, a trunk or duct for wind and straw communicating with the fan-casing and having an inner section and an outer section telescopically connected to the inner section, a deflector at the outer end of the telescopic section, means for positively moving said outer telescopic section together with the deflector longitudinally of the duct, and means for adjusting the deflector independently of the telescoping section, whereby the deflector can be adjusted bodily toward and from the fan and also into different positions relative to the path of the air and straw, substantially as set forth.

12. In a pneumatic straw-stacker, the combination of an ejector-fan, a discharge trunk or duct communicating with the fan-casing and having an outer section adapted to be adjusted longitudinally of the trunk to vary its length, a horizontally-vibrating base-support for said trunk, a deflector at the outer end of the trunk, and two independent sets of adjusting devices carried by the vibrating base-support, one set for positively moving the outer section of said trunk inward or outward to vary the total length of the trunk, and the second set for positively adjusting the deflector relatively to the discharge end of said trunk, substantially as set forth.

13. In a pneumatic straw-stacker, the combination of an ejector-fan, a discharge trunk or duct communicating with the fan-casing, and having an outer section adapted to be adjusted longitudinally of the trunk to vary its length, a horizontally-vibrating base-support for said trunk, a deflector at the outer end of the trunk movable independently thereof and three independent sets of adjusting devices carried by the vibrating base-support, one set for positively moving the outer section of said trunk and the deflector inward or outward, a second set for positively adjusting the deflector relatively to the discharge end of said trunk, and a third set for adjusting the outer end of the trunk vertically bodily, substantially as set forth.

14. In a pneumatic straw-stacker, the combination of an ejector-fan, a discharge-trunk having an inner section communicating with the fan-casing, and an outer section adapted to be telescoped longitudinally on the inner section, a deflector at the outer end of said telescoping section, and adjusting mechanism for moving the telescoping section longitudinally, comprising a toothed wheel and rack one of which is supported stationarily relatively to the inner trunk-section, and the other of which is connected to the telescoping section, and devices independent of said wheel and rack for adjusting the deflector relatively to the telescoping section, substantially as set forth.

15. In a pneumatic straw-stacker, the combination of an ejector-fan, an escape-duct leading from the fan, a trunk adapted for the passage therethrough of wind and straw having its outer end vertically adjustable and its inner end supported at the end of the fan-duct to move vertically relatively thereto, said trunk being formed in two parts of which one can slide on the other and having its outer delivery end movable longitudinally while in operation to vary the position of the edge over which the straw escapes, a deflector situated at the outer end of the sliding part of the trunk, and adjustable relatively to the longitudinal axis thereof, adjusting mechanism for moving the deflector and the sliding part of the trunk toward and from the fan comprising two mutually-engaging devices, one connected to the inner part of the trunk and the other connected to the sliding part, and a crank for actuating the said adjusting mechanism, substantially as set forth.

16. In a pneumatic straw-stacker, the combination of an ejector-fan, a turn-table or rotary base mounted above said fan, a duct-section mounted on said base to rotate therewith and communicating with said fan-casing, a discharge-trunk having its inner end communicating with and movable relatively to the upper end of the base duct-section, ropes or cables for supporting the outer end of said trunk, means for adjusting said ropes to raise or lower the outer discharge end of the trunk, a pivotally-mounted deflector at the outer end of said trunk, a rod connected to said deflector and extending rearward along the trunk, and a locking device engaging said rod to hold the deflector in any position of adjustment, substantially as set forth.

17. In a pneumatic straw-stacker, the combination of an ejector-fan, a discharge trunk or duct communicating with the fan-casing, and having an outer section adapted to be adjusted longitudinally of the trunk to vary its length, a vibrating base-support for said trunk, a deflector at the outer end of the trunk movable independently thereof, and three independent sets of adjusting devices, one set for positively moving the outer section of said trunk and the deflector inward and outward, a second set for positively adjusting the deflector relatively to the discharge end of said trunk, and a third set for adjusting the outer end of the trunk vertically bodily, substantially as set forth.

18. In a pneumatic straw-stacker, the combination of an ejector-fan and its casing, a turn-table or rotary base mounted above said fan, a duct-section mounted upon said base to rotate therewith and communicating with said fan-casing, a discharge-trunk having its inner end communicating with and movable relatively to the upper end of the base duct-section, ropes or cables for supporting the outer end of said trunk, means for adjusting said ropes to raise or lower the outer discharge end of the trunk, a pivotally-mounted deflector at the outer end of said trunk, an operating member connected to said deflector and extending rearward along the trunk, and a locking device engaging said operating member to hold the deflector in any position of adjustment, substantially as set forth.

19. The combination with a threshing-machine of a pneumatic stacker adapted to remove and convey away the treated material therefrom, comprising a blast mechanism, a vibratably-movable longitudinally-extensible delivery-duct communicating with the blast mechanism, and means connected therewith for vibratably moving and other means for longitudinally extending and retracting said duct at will during the operation of the machine.

20. The combination with a threshing-machine of a pneumatic stacker, comprising a blast mechanism, a horizontally-swiveled vertically-adjustable longitudinally-extensible material-delivery duct communicating with the blast mechanism, and means for horizontally moving vertically adjusting and positively extending and retracting the movable portion of said duct during operation, substantially as set forth.

21. The combination, in a pneumatic stacker adapted to convey away the treated material from a threshing-machine, of a suitable stationary fan-housing, a fan therein, a stationary duct-section connected to the fan-housing, a second duct-section vibratably connected to said stationary duct-section, a third duct-section telescopically connected to said second duct-section, a deflector secured to the outer end of said telescopic section, means for adjusting said deflector, means for adjusting said telescopic section in respect to said second duct-section, and means for swinging said second duct-section carrying said telescopic section and said deflector in respect to said stationary duct-section, whereby said duct may be swung to various positions, its total length varied, and the delivery of straw therefrom adjustably controlled, all while the machine is in operation.

22. The combination, with a threshing-machine, of a pneumatic conveyer, adapted to convey material away from said machine, comprising a fan-housing fixedly mounted in respect to said machine at its delivery end, a fan in said housing, a duct leading from said fan-housing, comprising a fixed section, a second section flexibly united to said fixed section, a third section telescopically connected to said second section, a deflector mounted on the discharge end of said third section, means for adjusting and moving said second and third sections both horizontally and vertically in respect to said stationary section, and other means for moving said third section longitudinally in respect to said second section, whereby the delivery or discharging point may be raised or lowered, swung from side to side, and moved in and out toward and from the machine, thus enabling the material to be delivered at any desired point on the stack, and enabling the stack to be made of any desired dimensions, substantially as set forth.

23. In a pneumatic stacker, the combination of a blast-fan, its housing, a conduit leading therefrom to a ring or turn-table, said turn-table, a stump or neck mounted thereon, a main delivery trunk or duct vibratably mounted in respect to said neck and composed of two sections one telescopically mounted in respect to the other, means for rotating said turn-table carrying the delivery trunk or duct, means for vibrating said trunk or duct, and means for telescopically moving one duct-section on the other, all said operating means being arranged at or near the base of the structure whereby the same can be conveniently manipulated from a convenient point during the operation of the machine.

24. In a pneumatic stacker adapted to remove and convey away the treated material from a threshing-machine, the combination of a blast-fan, its housing, a primary conduit or duct section leading therefrom, a main conduit or duct composed of two duct-sections telescopically connected, a union intermediate said primary duct and said main duct comprising two joints whereby motion in two directions is provided for, means for swinging said main duct in respect to said primary duct, and means for telescopically moving one of the main-duct sections in respect to the other, whereby the material can be delivered at points gradually farther from the thresher without altering the elevation of the conduit or chute and whereby the vertical position of the delivery end of the chute can be varied at any time, so that the material can not only be carried first nearer to and then farther from the thresher, but can also be piled higher and higher, as well as taken farther and farther out.

25. The combination with a threshing-machine, of a pneumatic stacker adapted to convey away the treated material therefrom, comprising a fan-housing, a fan therein, a duct-section leading from said housing, a second duct-section flexibly connected to said first duct-section, a third duct-section telescopically connected to said second duct-section, a deflector adjustably mounted at the discharging end of said third duct-section, means for adjusting said deflector, means extending down to near the lower end of the second duct-section for adjusting said third or telescopic duct-section in respect thereto, whereby said adjustment may be effected while the machine is in operation, and means for swinging the structure comprising said second and third duct-sections both vertically and horizontally.

26. In a pneumatic straw-stacker, the combination of a fan-housing, a fan therein, a rotary base or turn-table, a duct-section leading from said fan to said base, a duct-section supported upon and rotating with the base, a second duct-section supported upon said base and united to the base duct-section by a movable or yielding connection, a third outer duct-section telescopically connected to the second duct-section, said second and third duct-sections being adapted to have their outer ends raised and lowered relatively to the base, means for adjustably supporting the outer duct-section at different elevations, a duct-section telescopically-adjusting mechanism having one member connected to the second duct-section and a second member connected to the third outer duct-section, said members engaging with each other and being adapted to advance the third outer duct-section outwardly and to draw said duct-section inwardly, positively, while the machine is in operation, a deflector at the discharge end of the delivery-duct, and means for adjusting said deflector.

27. The combination, with a threshing-machine, of a pneumatic stacker adapted to remove and convey away the treated material therefrom, comprising an ejector-fan, a turn-table or rotary base, a duct-section leading from said fan to said base, a second duct-section connected thereto by motion-permitting joint construction, a third outer duct-section telescopically connected with said second duct-section, devices for positively moving said outer duct-section longitudinally to either increase or decrease the total length of the duct, said devices comprising a movable member connected with the outer duct-section and extending longitudinally thereof and of the second duct-section to a point adjacent to the inner end of said second duct-section, and a relatively stationary member arranged adjacent to the base-section and engaging with and adapted to impart motion to said movable member, whereby the operator can either increase or diminish the length of the duct from a point near the inner end thereof while the machine is in operation, substantially as set forth.

In witness whereof I have hereunto set my hand and seal, at Indianapolis, Indiana, this 15th day of April, A. D. 1902.

JOHN H. ELWARD. [L. S.]

Witnesses:

CHESTER BRADFORD,
JAMES A. WALSH.